United States Patent
Jetcheva et al.

(10) Patent No.: US 11,449,527 B2
(45) Date of Patent: Sep. 20, 2022

(54) AUTOMATED INQUIRY RESPONSE SYSTEMS

(71) Applicant: FUJITSU LIMITED, Kawasaki (JP)

(72) Inventors: Jorjeta G. Jetcheva, San Jose, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 869 days.

(21) Appl. No.: 15/665,305

(22) Filed: Jul. 31, 2017

(65) Prior Publication Data
US 2019/0034514 A1    Jan. 31, 2019

(51) Int. Cl.
| | |
|---|---|
| *G06F 16/28* | (2019.01) |
| *G06F 7/14* | (2006.01) |
| *G06N 3/08* | (2006.01) |
| *G06F 16/35* | (2019.01) |
| *G06F 16/332* | (2019.01) |
| *G06Q 30/00* | (2012.01) |
| *G06N 3/04* | (2006.01) |
| *G06F 16/9535* | (2019.01) |

(52) U.S. Cl.
CPC ............ *G06F 16/285* (2019.01); *G06F 7/14* (2013.01); *G06F 16/3329* (2019.01); *G06F 16/355* (2019.01); *G06N 3/08* (2013.01); *G06F 16/9535* (2019.01); *G06N 3/0454* (2013.01); *G06Q 30/016* (2013.01)

(58) Field of Classification Search
CPC .. G06F 16/285; G06F 16/3329; G06F 16/355; G06F 7/14; G06F 16/9535; G06N 3/08; G06N 3/0454; G06Q 30/016
USPC ........................................................ 707/737
See application file for complete search history.

(56) References Cited

U.S. PATENT DOCUMENTS

| | | | |
|---|---|---|---|
| 10,311,371 B1 * | 6/2019 | Hotchkies | H04L 67/2847 |
| 10,331,681 B1 * | 6/2019 | Chen | G06Q 30/00 |
| 10,387,894 B2 * | 8/2019 | Akkiraju | G06Q 30/0269 |

(Continued)

OTHER PUBLICATIONS

Yi et al. "Semi-Crowdsourced Clustering: Generalizing Crowd Labeling by Robust Distance Metric Learning". Advances in Neural Information Processing Systems 25 (2012).

(Continued)

*Primary Examiner* — Hanh B Thai
(74) *Attorney, Agent, or Firm* — Maschoff Brennan

(57) ABSTRACT

A method of automated inquiry response includes forming clusters that represent a meaning. The method includes assigning a level of sophistication to the clusters and generating sub-clusters within the clusters that represent a sentiment or a level of sophistication. The method includes assigning responses to the sub-clusters that address the meaning of the cluster and are modified based on the sentiment or a level of sophistication. The method includes computing a substantive issue, a sentiment, and a level of sophistication of a received inquiry. The method includes identifying clusters to which the inquiry pertains and generating an order of the identified clusters based on the assigned level of sophistication. The method includes crowdsourcing a comparison of the substantive issue of the inquiry to meanings of the identified clusters. The method includes offering a response associated with one of the identified clusters and with the sub-cluster for the identified sentiment.

20 Claims, 11 Drawing Sheets

(56) References Cited

U.S. PATENT DOCUMENTS

| | | | | |
|---|---|---|---|---|
| 11,023,774 | B2* | 6/2021 | Nefedov | G06F 16/334 |
| 2006/0224587 | A1* | 10/2006 | Zamir | G06F 16/24534 |
| 2006/0224624 | A1* | 10/2006 | Korn | G06F 16/9535 |
| 2014/0279996 | A1* | 9/2014 | Teevan | G06F 16/38 |
| | | | | 707/706 |
| 2017/0060982 | A1* | 3/2017 | Akkiraju | G06F 16/955 |
| 2017/0223190 | A1* | 8/2017 | Mandel | H04M 3/5233 |
| 2017/0262485 | A1* | 9/2017 | Saeki | G06F 3/061 |

OTHER PUBLICATIONS

Yalavarthi et al. "Probabilistic Entity Resolution with Imperfect Crowd". Nanyang Technological University, Singapore. Jan. 28, 2017.
Amazon.com, Inc. (2005). "AmazonMechanical Turk: Artificial Artificial Intelligence". Retrieved Mar. 21, 2022, from https://www.mturk.com/mturk/welcome.
Mighty AI, Inc. (2014). "Mighty Ai". Retrieved Mar. 21, 2022, from https://mty.ai/.
Kass, Alex. (Feb. 2, 2016). "Putting Crowdsourcing to Work for the Enterprise (Part 4)". from https://www.accenture.com/us-en/blogs/blogs-putting-crowdsourcing-work-enterprise-part-4.

\* cited by examiner

Collective Matrix Factorization 800

First Matrix 800

| Customers 122 | | Inquiries 802 | | Sentiment 804 | | Level of Sophistication 806 | |
|---|---|---|---|---|---|---|---|
| First Customer | 122A | First Inquiry | 802A | First Sentiment | 804A | First Level of Sophistication | 806A |
| Second Customer | 122B | Second Inquiry | 802B | Second Sentiment | 804B | Second Level of Sophistication | 806B |
| ⋮ | | ⋮ | | ⋮ | | ⋮ | |
| Nth Customer | 122N | Third Inquiry | 802N | Third Sentiment | 804N | Third Level of Sophistication | 806C |

Second Matrix 808

| Representatives 124 | | First Cu 122A | Second Customer 122B | Nth Customer 122N | |
|---|---|---|---|---|---|
| First Representative | 124A | First Ra 810A | Fourth Rating 810D | Seventh Rating | 810G |
| Second Representative | 124B | Second 810B | Fifth Rating 810E | Eighth Rating | 810H |
| ⋮ | | ⋮ | ⋮ | ⋮ | |
| Nth Representative | 124N | Third R: 810C | Sixth Rating 810F | Ninth Rating | 810I |

Third Matrix 812

| Representatives 124 | | Sentiment 814 | Level of Sophistication 816 |
|---|---|---|---|
| First Representative | 124A | 0.7 | 0.3 |
| Second Representative | 124B | 0.8 | 0.3 |
| ⋮ | | ⋮ | ⋮ |
| Nth Representative | 124N | 0.1 | 0.5 |

FIG. 8

AUTOMATED INQUIRY RESPONSE SYSTEMS

FIELD

The embodiments discussed herein are related to automated inquiry response systems.

BACKGROUND

Enterprises such as corporations or governmental institutions may want to increase customer satisfaction. In particular, the enterprises may implement systems and processes to improve an experience when a customer reaches out to a customer support center. For instance, the customer may reach out to the customer support center when a problem arises on a website or during provision of a service by the enterprise. Customer satisfaction may increase by ensuring that an interaction is meaningful, relevant to a need of the customer or the topic, and information is provided to the customer at a correct level of sophistication and tone.

In current systems, a pool of representatives may be available to answer questions. For instance, the customer may submit a question via email or call the pool of representatives. The representatives may manually determine the substantive issues of the call and then respond to the best of their abilities. However, the pool of representatives is expensive and resource intensive and this is a difficult job for people. For instance, the representatives may have adequate technical training in the systems of the enterprise, but may not be well suited to deal with customers who are frustrated or angry. Alternatively, the representatives may be well suited to deal with angry customers, but may need training in the technology of the enterprise to properly address issues of the customers.

Alternatively, some enterprises implement automated systems. In an example of the automated systems, the customer calls and is subjected to several lists of questions to which the customer presses a number on their phone or says a number that corresponds to an answer to the questions. The automated systems may reduce resource allocation in training of representatives. However, the automated systems are not able to address the tone or the sentiment of the customer. An angry customer is subjected to the same experience as a neutral customer.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of automated inquiry response may include receiving historical inquiries. The method may include forming clusters based on the historical inquiries. Each of the clusters may represent a substantive meaning of a subset of the historical inquiries. The method may include assigning a level of sophistication to the clusters. The method may include generating sub-clusters within each of the clusters. Each of the sub-clusters may represent a level of sophistication or a sentiment of one or more of the subset of the historical inquiries of the cluster. The method may include assigning a set of responses to each of the clusters. Each response may be assigned to one of the sub-clusters. The set of responses may include a common substantive theme that addresses the substantive meaning of the cluster. Each response may be modified based on the level of sophistication or the sentiment of the subset of the historical inquiries of the sub-cluster. The method may include receiving a current inquiry. The method may include computing a substantive issue of the current inquiry, a sentiment of the current inquiry, and a level of sophistication of the current inquiry. Based on the substantive issue of the current inquiry, the method may include identifying two or more of the clusters to which the current inquiry pertains. The method may include generating an order of the two or more identified clusters. The order may be set according to the computed level of sophistication relative to the levels of sophistication assigned to the clusters. The method may include crowdsourcing a comparison of the substantive issue of the current inquiry to meanings from each of the two or more identified clusters. The comparison may be applied to each of the two or more identified cluster according to the generated order. The comparison may cease at one of the two or more identified clusters that includes a substantive meaning that substantially matches the substantive issue of the current inquiry. The method may include offering a particular response to a customer device. The particular response may be associated with one of the two or more identified clusters that includes a substantive meaning that matches the substantive issue of the current inquiry according to the crowdsourcing and being associated with the sub-cluster generated in the one identified cluster for the sentiment or the level of sophistication of the current inquiry.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 8 is an example matrix factorization that may be implemented in the process of FIG. 7;

DESCRIPTION OF EMBODIMENTS

Figure 1:
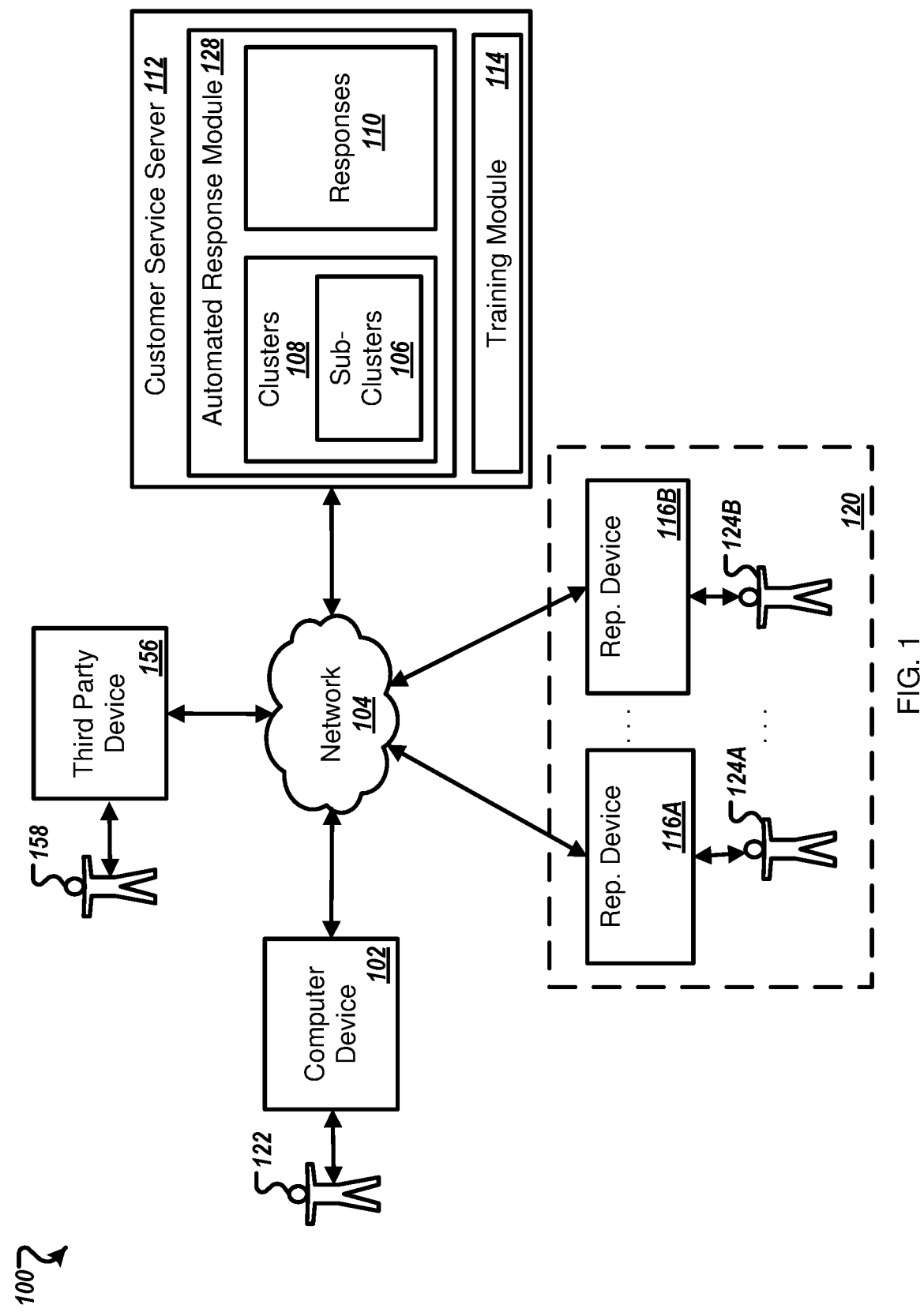
FIG. 1 is a block diagram of an example operating environment in which one or more embodiments may be implemented.

Enterprises such a corporations or governmental institutions may implement systems and processes to address customer inquiries. In some current systems, representatives may field questions that are submitted over the phone or live-chat via an electronic interface. The representatives generally work in a pool where they sit and wait for customers to call. The representatives may answer the same question multiple times and may field questions from customers with different sentiments, which may range from excited and positive to angry and abusive. For the representatives to be effective, they usually receive training regarding technical aspects of the enterprise. The technical training may be sufficient to discuss a technology with a customer who has a high level of sophistication as well as with a customer who has a low level of sophistication. Additionally, in these systems, the sentiment of the customer may be ascertained by the representatives. However, the representatives must be trained to deal with customers who have a negative sentiment while maintaining a high level of customer satisfaction.

In other existing systems, some enterprises implement an automated inquiry response system that may include an option to speak to a representative. In the automated inquiry response systems, the automated inquiry response system may communicate a question to the customer to attempt to determine the topic of the question. In response, the customer may key in or say an answer. The automated inquiry response system may then communicate a subsequent question, which again may narrow the topic of the question of the customer. However, these existing systems deal with all customers the same way. These systems cannot account for a sentiment or a level of sophistication of the customer or the question. For instance, the responses are the same regardless of whether the customer is angry and hostile or excited and confused.

These and other systems thus suffer from a technical limitation regarding an ability to determine sentiment and level of sophistication of the customer or the question. Indeed, these systems are unable to make the determination as to the sentiment or the level of sophistication, which decreases effectiveness of these systems and leads to problematic, erroneous interactions with customers. Moreover, these and other systems rely on feedback from the customer to navigate through a set of questions, which ultimately leads to a topic of the question. The sets of questions communicated by the automated system often aggravate the customer.

Accordingly, embodiments described in the present disclosure relate to automated inquiry response systems. Some embodiments of the automated inquiry response systems may include a training or bootstrapping process. During the training process historical inquiries that have been previously submitted are used to train the system. Clusters may be formed that each relate to a substantive meaning of a subset of the historical inquiries.

A level of sophistication or a sentiment type may be assigned to each of the clusters. The level of sophistication may be representative of a complexity of substantive meaning of the subset of the historical inquiries. For example, multiple clusters may relate to establishment of connection between a device and a wireless networking system. The cluster that answers a basic question such as "How do I turn on the wireless antenna," may be assigned a basic level of sophistication. The cluster that answers an intermediate question such as "How do I find the DHCP information for my wireless network," may be assigned an intermediate level of sophistication.

Additionally, sub-clusters may be formed within each of the clusters. The sub-clusters may each relate to a sentiment and/or a level of sophistication. For example, within one of the clusters there may be a first sub-cluster that is directed to an angry sentiment, a second sub-cluster that is directed to a neutral sentiment, a third sub-cluster that is directed to a basic level of sophistication, and a fourth sub-cluster that is directed to an intermediate level of sophistication.

A set of responses may be generated for the cluster. Each of the set of responses may have a common theme. For instance, each of the set of responses may address wireless network connections. In addition, each of the responses may be associated with one of the sub-clusters and may be modified according to the sub-cluster. For instance, the response associated with the angry sentiment may include an apology, which may be followed by the technical information while the response associated with the basic level of sophistication may include more detailed instructions. Additionally, the response associated with a basic level of sophistication may include more instructions that detail basic steps while the response associated with an intermediate level of sophistication may include fewer instructions.

In these and other embodiments, the automated inquiry response system may receive a current inquiry. The automated response system may then compute a sentiment, a substantive issue, and a level of sophistication of an inquiry submitted by a customer. Computation of the sentiment, the substantive issue, and the level of sophistication may be performed using neural networks trained on the historical inquiries with crowdsourced labels for sentiments and levels of sophistication, for instance. The automated inquiry response system may then determine the cluster to which the current inquiry pertains based on the computed substantive issue and may determine the sub-cluster based on the computed sentiment. The automated inquiry response system may then access the response associated with the sub-cluster and offer the response to the customer who submitted the current inquiry. In some embodiments, if the offered response is insufficient, the customer may be routed to a representative.

In embodiments described in the present disclosure, assignment of the level of sophistication, formation of sub-clusters, determination of the cluster and/or sub-cluster to which the current inquiry pertains, or some combination thereof may be crowdsourced. For example, one or more of the assignment, formation, and determination may be crowdsourced to individuals who provide feedback that may be analyzed to find a majority or consensus. Use of crowdsourcing to support computer processes is a non-conventional process. The use of the crowdsourcing may reduce use of processing resources, may increase accuracy of conclusions reached, and increase the speed with which accurate conclusions are reached. Moreover, crowdsourcing may be well-suited to determine characteristics such as sentiment, which may be difficult for a computing system to define and may supplement or complement the processes performed by a computing system.

Thus, embodiments described in the present provide a technical solution to the technical limitations of existing systems. Instead of asking a set of questions to the customer to determine the substantive meaning, embodiments described herein determine the substantive meaning from the current inquiry. Moreover, embodiments described herein determine a sentiment and a level of sophistication and offer a response that is modified according to the sentiment and/or the level of sophistication. Thus, the technical solutions described herein provide an improvement to computing systems implementing automated inquiry response by training the computing systems to form clusters and sub-clusters with which responses are associated. Further, the technical solutions apply a computing process to inquiries to automate responses to the inquiries based on sentiment and level of sophistication that before had to be discerned by representatives.

These and other embodiments are described with reference to the appended figures. In the figures, features labeled with the same item number indicate a similar structure and function unless otherwise specified.

FIG. 1 is a block diagram of an example operating environment 100 according to at least one embodiment described in the present disclosure. Automated inquiry response may be implemented in the operating environment 100. The automated inquiry response may be implemented to automatically address one or more inquiries submitted by a customer 122. For example, a customer service server 112 may receive inquiries from the customer 122. The customer service server 112 may offer responses 110 to a computer device 102 associated with the customer 122. The responses 110 offered to the customer 122 may be based on a substantive issue of the inquiry, a sentiment of the inquiry, a level of sophistication of the inquiry, or some combination thereof.

The customer service server 112 may include one or more clusters 108. The clusters 108 may include sub-clusters 106. The clusters 108 may represent a substantive meaning. The substantive meaning may include a concept, topic, etc., which may correlate to a concept, topic, etc. of the inquiry. The clusters 108 may be assigned a level of sophistication. The sub-clusters 106 may be organized within the clusters 108. The sub-clusters 106 may represent a sentiment and/or a level of sophistication within the clusters 108. For example, the sentiment may include angry, neutral, frustrated, happy, etc. The level of sophistication may include a basic, complex, intermediate, advanced-complex, etc. Thus, one of the clusters 108 may include an angry sub-cluster, a neutral sub-cluster, a frustrated sub-cluster, a happy sub-cluster, a basic sub-cluster, a complex sub-cluster, an advanced-complex sub-cluster, etc.

The responses 110 may be assigned to the sub-clusters 106. For instance, one of the clusters 108 may include the substantive meaning of network connections. Accordingly, the responses 110 may all address inquiries related to network connections. The sub-clusters 106 may include a negative sentiment of the customer 122 and a positive sentiment. The response 110 associated with the negative sentiment may include a common substantive theme as the response 110 associated with the positive sentiment (e.g., how to establish a network connection). Each of the responses 110 may be modified based on the sentiment of the sub-cluster 106. For instance, the response 110 associated with the negative sentiment may include an apology for the inconvenience while the response 110 associated with the positive sentiment may include a thank you message.

Formation of the clusters 108 and/or the sub-clusters 106 in the operating environment 100 may be based at least partially on crowdsourced information. The crowdsourced information may be communicated from one or more representative 124A and 124B (generally, representative 124 or representatives 124) or third party evaluators 158 that may be associated with a third party device 156. For instance, the representatives 124 and/or the third party evaluators 158 may identify the sentiments of the sub-clusters 106 and/or the levels of sophistication of the clusters 108. Additionally, the representatives 124 may provide feedback regarding the organization of the clusters 108 and substantive meanings of the clusters 108.

In addition, the operating environment 100 may enable feedback from the customer 122 and/or the computer device 102. For example, the response 110 offered to the customer 122 may be inadequate to address the inquiry. The customer 122 may communicate a message indicating that the response 110 offered by the customer service server 112 is inadequate. The customer service server 112 may assign to the customer 122 and/or the inquiry to one of the representatives 124. In some embodiments, assignment of the customer 122 may be based on a collective matrix factorization, which may be based on the clusters 108, the sub-clusters 106, the responses 110, substantive meanings, sentiments, levels of sophistication, or some combination thereof.

The operating environment 100 may include the customer service server 112, representative computer devices 116A and 116B (generally, rep. devices 116 or rep. device 116), the computer device 102, the third party device 156, and a network 104. The customer service server 112, the rep. devices 116, the third party device 156, and the computer device 102 may communicate data and information via the network 104. Each of the network 104, the customer service server 112, the third party device 156, the rep. devices 116, and the computer device 102 are described in the following paragraphs.

The network 104 may include wired or wireless configurations, and may have configurations including a star configuration, token ring configuration, or other configurations. Furthermore, the network 104 may include a local area network (LAN), a wide area network (WAN) (e.g., the Internet), and/or other interconnected data paths across which multiple devices may communicate. In some embodiments, the network 104 may include a peer-to-peer network. The network 104 may also be coupled to or include portions of a telecommunications network that may enable communication of data in a variety of different communication protocols.

In some embodiments, the network 104 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

The computer device 102, the third party device 156, and the rep. devices 116 may include a computing system that includes a processor, memory, and computing capabilities. In the illustrated embodiments, the computer device 102, the third party device 156, and the rep. devices 116 may be coupled to the network 104 to send and receive information via the network 104.

The computer device 102 may be configured to communicate inquiries to the customer service server 112 via the network 104. The inquiries may include user input that the customer 122 inputs into the computer device 102. For instance, the customer 122 may view and interface with a website hosted by the customer service server 112 or another server that is associated with the customer service server 112. Additionally, the inquiry may include an email, text message, a recorded audio or video message, or another suitable electronic message that may be generated at the computer device 102 and communicated to the customer service server 112.

In addition, the computer device 102 may be configured to receive the responses 110 from the customer service server 112. After the response 110 is received by the computer device 102, the response 110 or some portion or derivative thereof may be presented or displayed by the computer device 102. For instance, the computer device 102 may display text that is representative of the response 110.

The computer device 102 may also receive user input that is indicative of feedback of the customer 122. For instance, the response 110 may be displayed by the computer device 102. The customer 122 may be dissatisfied with the response 110. Accordingly, the customer 122 may provide user input to the computer device 102 that is indicative of the dissatisfaction. The computer device 102 may communicate the user input or a message representative thereof to the customer service server 112.

In response to the message indicating that the customer 122 is dissatisfied with the offered response 110, the customer service server 112 may then assign the customer 122 to one of the representatives 124. Assignment may include communicatively coupling the computer device 102 to one of the rep. devices 116 via the network 104. The assignment to the representative 124 may be based on the collective matrix factorization. Some details of the collective matrix factorization are provided elsewhere in the present disclosure. The representative 124 may provide additional support and information to the customer 122. The additional support and information may address the inquiry.

The rep. devices 116 may be included in a customer representative pool 120. For instance, an enterprise may implement the customer service server 112 with the customer representative pool 120 to address inquiries by the customer 122.

The third party device 156 may be configured to receive input from the third party evaluator 158. The third party device 156 may communicate the input or data representative thereof to the customer service server 112 via the network 104. For example, the customer service server 112 may be configured to communicate information to the third party device 156 such that the information or some derivative thereof may be viewed and/or accessed by the third party evaluator 158. The third party evaluator 158 may provide some feedback regarding the information. In some embodiments, the third party device 156 may be implemented in a public crowdsource platforms such as Amazon Mechanical Turk.

The rep. devices 116 may be configured to receive input from the representatives 124. The rep. devices 116 may communicate the input or data representative thereof to the customer service server 112 via the network 104. For example, the customer service server 112 may be configured to communicate information to the rep. devices 116 such that the information or some derivative thereof may be viewed and/or accessed by the representatives 124. The representatives 124 may provide some feedback regarding the information. As described in the present disclosure, the representatives 124 may include individuals.

The customer service server 112 may communicate the information to multiple rep. devices 116 and/or to the third party device 156 such that the information is accessible to multiple representatives 124 and the third party evaluator 158. The feedback received regarding the information from the multiple rep devices 116 and/or to the third party device 156 may be weighed or otherwise analyzed to determine a consensus or a majority opinion among the feedback. The consensus or the majority opinion may represent a crowdsourced input to the customer service server 112. Throughout the present disclosure, discussion of crowdsourcing to the rep. devices 116 may include crowdsourcing to the third party device 156.

The customer service server 112 may include a hardware server that includes a processor, memory, and communication capabilities. In the illustrated embodiments, the customer service server 112 may be coupled to the network 104 to send and receive data and information to and from the computer device 102 and the rep. devices 116 via the network 104.

In some embodiments, the customer service server 112 may include an automated response module 128 and a training module 114. The automated response module 128 and the training module 114 may be implemented using hardware including a processor, a microprocessor (e.g., to perform or control performance of one or more operations), a field-programmable gate array (FPGA), or an application-specific integrated circuit (ASIC). In some other instances, the automated response module 128 and the training module 114 may be implemented using a combination of hardware and software. Implementation in software may include rapid activation and deactivation of one or more transistors or transistor elements such as may be included in hardware of a computing system (e.g., the devices 102 and 116 and the customer service server 112). Additionally, software defined instructions may operate on information within transistor elements. Implementation of software instructions may at least temporarily reconfigure electronic pathways and transform computing hardware.

The training module 114 may be configured to receive historical inquiries. The historical inquiries may have been submitted earlier in the operating environment 100 or in a similar operating environment. The training module 114 may form the clusters 108. The clusters 108 may be based on the historical inquiries. As stated above, each of the clusters 108 may represent a substantive meaning of a subset of the historical inquiries. For instance, a first subset of the historical inquiries may all relate to connecting a piece of equipment to the Internet, a second subset of the historical inquiries may all relate to a particular website functionality, and a third subset of the historical inquiries may all relate to a particular service provided by an enterprise. In some embodiments, formation of the clusters 108 may be based on topic modeling, probabilistic language models applied to the historical inquiries, neural network modeling, or some portion thereof.

The training module 114 may be configured to validate the clusters 108. In some embodiments, validation of the clusters 108 may include performance of a pair-wise comparison of the historical inquiries included in each of the clusters 108. Additionally, the validation may include a merge of the clusters 108 to combine one or more of the clusters 108. Merging of the clusters 108 may include performance of a pair-wise comparison of one of the historical inquiries from each of the clusters 108 with one of the inquiries from each of the other clusters 108.

The training module 114 may be configured to assign the level of sophistication to the clusters 108. For example, the cluster 108 may represent the substantive meaning of the subset of historical inquiries. The training module 114 may be configured to assign the level of sophistication of the substantive meaning of the subset of the historical inquiries of the cluster 108.

In some embodiments, assignment of the level of sophistication may be crowdsourced to the rep. devices 116 and/or the third party device 156. For instance, the customer service server 112 may be configured to communicate the clusters 108 to the rep. devices 116. The representatives 124 may provide input that indicates the level of sophistication. The training module 114 may, based on the representative input, assign the level of sophistication to the clusters 108.

In addition, the training module 114 may be configured to assign the sentiment to one or more of the subset of the historical inquiries that are included in each of the clusters 108. For example, the clusters 108 may represent the substantive meaning of ten of the historical inquiries. The training module 114 may be configured to assign the sentiment and/or the level of sophistication to each of the subset of the historical inquiries of the clusters 108.

In some embodiments, assignment of the sentiment may be crowdsourced to the rep. devices 116 and/or the third party device 156. For instance, the customer service server 112 may be configured to communicate the clusters 108 to the rep. devices 116 and historical inquiries included therein. The representatives 124 may provide input that indicates the sentiment and the level of sophistication of the historical inquiries. The training module 114 may, based on the representative input, assign the sentiment and/or the level of sophistication to the historical inquiries.

The training module 114 may generate the sub-clusters 106. The sub-clusters 106 may be generated for each of the clusters 108. The sub-clusters 106 may represent the level of sophistication and/or a sentiment of one or more of the subset of the historical inquiries of the clusters 108.

The training module 114 may be configured to assign a set of the responses 110 to each of the clusters 108. Each of the responses of the set of responses 110 may be assigned to one of the sub-clusters 106. The set of responses 110 may include a common substantive theme that addresses the substantive meaning of the clusters 108. Each of the responses 110 may be modified according to one of the levels of sophistication or one of the sentiments of the sub-clusters 106. Accordingly, in some embodiments, the training module 114 may assign one of the responses 110 to each of the sub-clusters 106 in each of the clusters 108.

The automated response module 128 may be configured to receive a current inquiry. The current inquiry may be communicated from the computer device 102 via the network 104. The current inquiry may pertain to a substantive issue. The automated response module 128 may be configured to compute the substantive issue of the current inquiry, a sentiment of the current inquiry, and a level of sophistication of the current inquiry. In some embodiments, the computing includes processing the current inquiry using a neural network.

Based on the substantive issue of the current inquiry, the automated response module 128 may identify two or more of the clusters 108 to which the current inquiry may pertain. The automated response module 128 may generate an order of the identified clusters 108. The order may be set according to the computed level of sophistication relative to the levels of sophistication assigned to the clusters.

The automated response module 128 may crowdsource a comparison of the substantive issue of the current inquiry to the meaning from each of the identified clusters 108. The comparison may be applied to each of the identified clusters according to the generated order. The comparison may cease at one of the identified clusters that includes a substantive meaning that matches or substantially matches the substantive issue of the current inquiry.

For example, the identified clusters 108 may include a first cluster with a first assigned level of sophistication of 0.1, a second cluster with a second assigned level of sophistication of 0.75, a third cluster with a third assigned level of sophistication of 0.3, and a fourth cluster with a fourth assigned level of sophistication of 0.6. The current inquiry may have a computer level of sophistication of 0.4. Accordingly, the automated response module 128 may generate an order of the clusters 108. The order may be set based the computed level of sophistication relative to the levels of sophistication assigned to the clusters. For instance, the order may be set according to a difference between the computer levels of sophistication and the computer inquiry. Thus, the generated order may be the third cluster (difference of 0.1), the fourth cluster (difference of 0.2), the first cluster (difference of 0.3), and the second cluster (difference of 0.35).

The comparison between the substantive issue of the current inquiry and the meaning from each of the identified clusters 108 may be applied to each of the identified clusters 108 according to the generated order. For instance, the comparison may be applied to the third cluster, followed by the fourth cluster, followed by the first cluster, and followed by the second cluster.

In response to the substantive meaning that matches or substantially matches the substantive issue of the current inquiry, the comparison may cease. For instance, in response to the substantive meaning of the first cluster matching the substantive issue of the current inquiry, the comparison may not be applied to the second cluster.

The automated response module 128 may offer one of the responses 110 to the computer device 102. The offered response 110 may be associated with the identified cluster 108 that includes a substantive meaning that matches or best matches the substantive issue of the current inquiry according to the crowdsourcing. Additionally, the offered response 110 may be associated with one of the sub-clusters 106 of the clusters 108. The offered response 110 may be associated with the sub-cluster 106 generated in the identified cluster 108 for the sentiment and/or the level of sophistication of the current inquiry.

For instance, a first and a second of the clusters 108 may be identified as having substantive meanings that are similar to the computed substantive issue of the current inquiry. The representatives 124 may provide feedback indicating that the first of the clusters 108 matches the substantive issue of the current inquiry. Accordingly, the offered response 110 may be associated with the first of the clusters 108. Additionally, the computed sentiment of the current inquiry may be hostile and the computed level of sophistication may be complex. Accordingly, the offered response 110 may be associated with the sub-cluster 106 that is generated in the first of the clusters 108 and for the hostile sentiment and/or for the complex level of sophistication.

The customer service server 112 may be configured to receive feedback from the customer 122. The feedback may indicate that the offered response is insufficient. Responsive to the feedback, the customer service server 112 may assign the current inquiry to one of the representatives 124. In some embodiments, the customer service server 112 may assign the current inquiry based on a collective matrix factorization.

The collective matrix factorization may track the feedback from the customer 122 and/or whether the assigned representative 124 adequately addressed the current inquiry. Based on the collective matrix factorization, the customer service server 112 may identify an issue or problem in a service related to the current inquiry. For instance, identification of the issue or the problem may be based on the substantive issue of the current inquiry and other inquiries, the sentiment of the current inquiry and other inquiries, and the level of sophistication of the current inquiry and other inquiries. The customer service server 112 may also be configured to evaluate the representatives 124. For instance, based on the collective matrix factorization or on metrics tracked by the customer service server 112, the customer service server 112 may evaluate the representatives 124.

Modifications, additions, or omissions may be made to the operating environment 100 without departing from the scope of the present disclosure. The present disclosure may apply to an operating environment that may include one or more customer service servers 112, one or more networks 104, one or more third party devices 156, one or more computer devices 102, one or more rep. devices 116 or any combination thereof. Moreover, the separation of various components in the embodiments described in the present disclosure is not meant to indicate that the separation occurs in all embodiments. It may be understood with the benefit of this disclosure that the described components may be integrated together in a single component or separated into multiple components.

Figure 2:
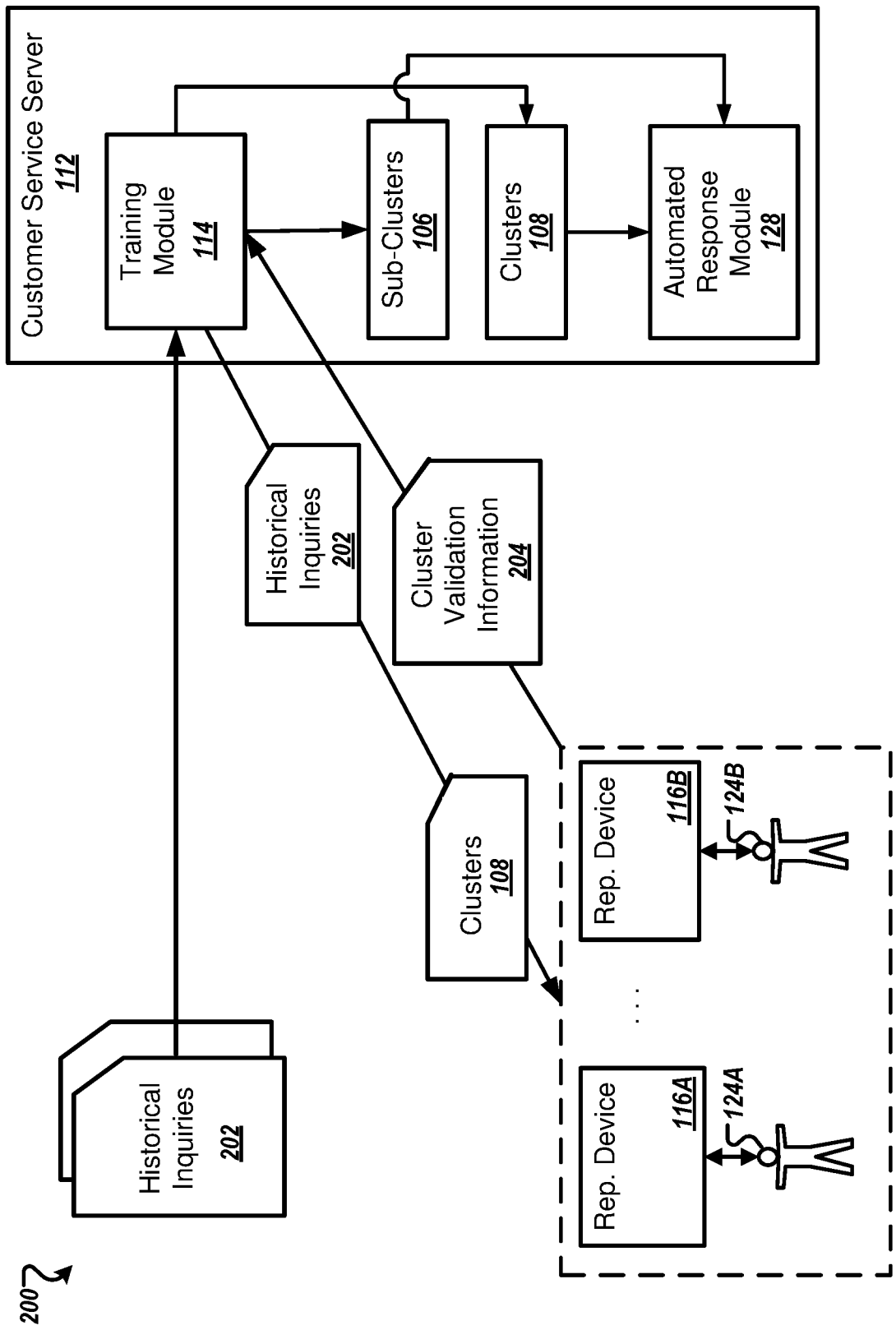
FIG. 2 is a block diagram of an example process of generating the clusters and the sub-clusters that may be implemented in the operating environment of FIG. 1.

FIG. 2 is a block diagram of an example process 200 of generating the clusters 108 and the sub-clusters 106. The process 200 of FIG. 2 may include the customer service server 112, the rep. devices 116, the training module 114, the automated response module 128, and the representatives 124 described with reference to FIG. 1.

In the process 200, the training module 114 may be configured to receive historical inquiries 202. The historical inquiries 202 may have been submitted earlier e.g., prior to implementation of the customer service server 112 in an operating environment 100 or submitted in a similar operating environment. The historical inquiries 202 may include sets of questions and responses, the text/transcriptions of the sets of questions and responses, videos of the sets of questions and responses, audio recordings of the sets of questions and responses, metadata related to the sets of questions and responses, or combinations thereof.

The training module 114 may be configured to analyze the historical inquiries 202 or some portion thereof. For example, the training module 114 may perform a topic modeling of the historical inquiries 202. The topic modeling may include a statistical model for discovering a topic in the historical inquiries 202. Some details of topic modeling performed in some embodiments are as described by THE STANFORD NATURAL LANGUAGE PROCESSING GROUP available at https://nlp.stanford.edu/software/tmt/tmt-0.4/, which is incorporated herein by reference in its entirety. Additionally or alternatively, the training module 114 may perform probabilistic language models, which may be applied to the historical inquiries 202. In some embodiments, the probabilistic language model implemented by the training module 114 may be performed as described in Bengio et al. *A Neural Probabilistic Language Model*, J. OF MACHINE LEARNING RESEARCH 3 (2003) 1137-1155, which is incorporated herein by reference in its entirety. Additionally still, the training module 114 may implement neural network modeling applied to the historical inquiries 202.

Figure 3:
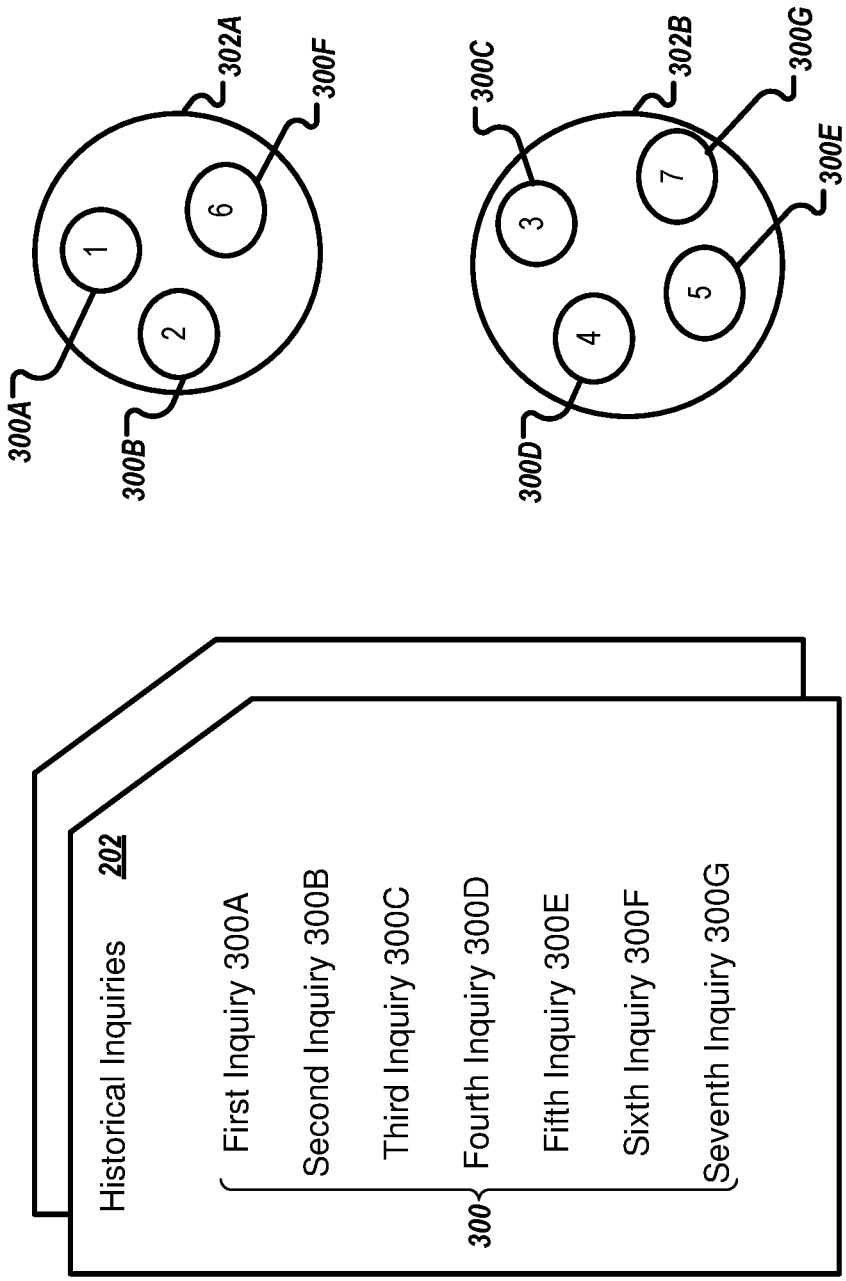
FIG. 3 is a block diagram of an example historical inquiries and clusters that may be implemented in the process of FIG. 2.

Based on the analysis of the historical inquiries 202, the clusters 108 may be formed. The clusters 108 may represent a substantive meaning of a subset of the historical inquiries 202. For instance, FIG. 3 is a block diagram of an example embodiment of the historical inquiries 202 and clusters 302A and 302B that may be implemented in the process 200 of FIG. 2. The clusters 302A and 302B may be substantially similar and may correspond to the clusters 108 described elsewhere in the present disclosure.

With reference to FIG. 3, the historical inquiries 202 may include a set of inquiries 300. The set of inquiries 300 may have been submitted prior to implementation of the customer service server 112. The set of inquiries 300 in FIG. 3 include seven inquiries 300A-300G. The set of inquiries 300 may be formed into two clusters 302A and 302B. For example, a first cluster 302A may include a first inquiry 300A, a second inquiry 300B, and a sixth inquiry 300F. A second cluster 302B may include a third inquiry 300C, a fourth inquiry 300D, a fifth inquiry 300E, and a seventh inquiry 300G. In other embodiments, the historical inquiries 202 may include more than seven inquiries 300.

Inclusion of the inquiries 300 in one of the clusters 302A and 302B indicate that the inquiries 300 have a similar or the same substantive meaning. The similar or the same substantive meaning may be based on the analysis. For example, the inquiries included in one of the clusters 302A or 302B may pertain to the same topic, may have a similar response, may have a common technical theme, and the like.

Referring back to FIG. 2, to ensure that the historical inquiries 202 are properly formed in the clusters 108, the training module 114 may be configured to validate the clusters 108. Validation of the clusters 108 may be crowdsourced to the representatives 124. The representatives 124 may review the historical inquiries 202 and/or the substantive meaning thereof. In some embodiments, validation of the clusters 108 may include performance of a pair-wise comparison of the historical inquiries 202 included in each of the clusters 108. The representatives 124 may communicate cluster validation information 204 to the training module 114 with results of the pair-wise comparison.

Figure 4:
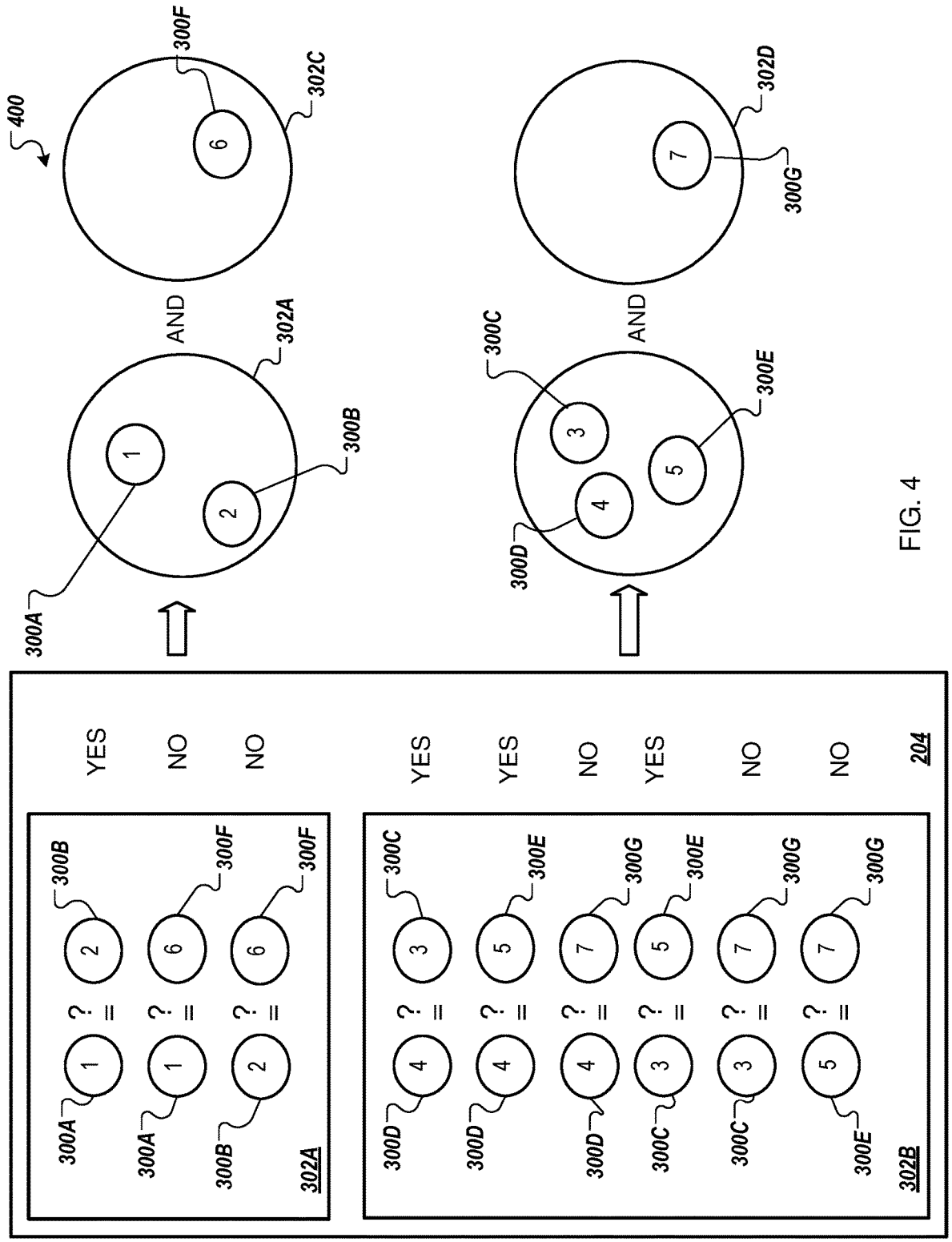
FIG. 4 depicts an example pair-wise comparison process that may be implemented in the process of FIG. 2.

FIG. 4 depicts an example pair-wise comparison process 400 that may be implemented in the process 200 of FIG. 2. In FIG. 4, a pair-wise comparison of the inquiries 300 of FIG. 3 is shown. For the first cluster 302A, the first inquiry 300A and the second inquiry 300B may be validated. For instance, the representatives 124 may evaluate the first inquiry 300A and the second inquiry 300B and determine that the first inquiry 300A and the second inquiry 300B have the same or a similar substantive meaning. Thus, the first inquiry 300A and the second inquiry 300B may remain in the first cluster 302A. The sixth cluster 302F may be dissimilar to the first inquiry 300A and the second inquiry 300B. Accordingly, the sixth cluster 302F may be moved to another cluster 302C.

Additionally, for the second cluster 302B, the third inquiry 300C, the fourth inquiry 300D, and the fifth inquiry 300E may be validated. For instance, the representatives 124 may evaluate the second cluster 302B, the third inquiry 300C, the fourth inquiry 300D, and the fifth inquiry 300E and determine that the second cluster 302B, the third inquiry 300C, the fourth inquiry 300D, and the fifth inquiry 300E have the same or a similar substantive meaning. Thus, the second cluster 302B, the third inquiry 300C, the fourth inquiry 300D, and the fifth inquiry 300E may remain in the second cluster 302B. The seventh cluster 302G may be dissimilar to the second cluster 302B, the third inquiry 300C, the fourth inquiry 300D, and the fifth inquiry 300E. Accordingly, the seventh cluster 302G may be moved to another cluster 302D.

With combined reference to FIGS. 2 and 4, the cluster validation information 204 may include the results of the pair-wise comparison such as validation and/or reorganization of the inquiries 300. The training module 114 may receive the cluster validation information 204. The training module 114 may then generate the additional clusters 302C and 302D and move dissimilar inquiries (e.g., the seventh inquiry 300G and the sixth inquiry 300F) to the additional clusters 302C and 302D.

Referring to FIG. 2, the training module 114 may be configured to assign the level of sophistication to each of the clusters 108. In some embodiments, the subset of the historical inquiries 202 and the clusters 108 may be communicated to the rep. devices 116. The representatives 124 may analyze the historical inquiries 202 and the clusters 108 to determine the level of sophistication thereof. In some embodiments, the level of sophistication may be assigned as a particular characteristic such as basic, intermediate complexity, complex, highly complex, etc. Additionally or alternatively, the level of sophistication may include a sophistication score, which may range from 0 to 1 (e.g., 0.1, 0.2, etc.) in which 0 is basic and 1 is highly complex.

The representatives 124 may communicate feedback to the training module 114. The feedback may indicate that the level of sophistication, from which the level of sophistication may be assigned to the clusters 108. Accordingly, in the customer service server 112, the clusters 108 may represent the substantive meaning of a subset of the historical inquiries 202 and the clusters 108 may have assigned a particular level of sophistication.

The training module 114 may be configured to assign the sentiment and/or the level of sophistication to the subset of the historical inquiries 202 that are included in each of the clusters 108. In some embodiments, the subset of the historical inquiries 202 may be communicated to the rep. devices 116. The representatives 124 may analyze the historical inquiries 202 to determine the sentiment and/or level of sophistication thereof. In some embodiments, the sentiment may include a particular characteristic such as happy, angry, frustrated, hostile, etc. In other embodiments, the sentiment may be assigned as a sentiment score. The sentiment score may range from 0 to 1 (e.g., 0.1, 0.2, etc.) in which 0 represents a positive sentiment and 1 represents a negative sentiment. Also, the level of sophistication may be assigned as a particular characteristic such as basic, intermediate complexity, complex, highly complex, etc. Additionally or alternatively, the level of sophistication may include a sophistication score, which may range from 0 to 1 (e.g., 0.1, 0.2, etc.) in which 0 is basic and 1 is highly complex.

The representatives 124 may communicate feedback to the training module 114. The feedback may indicate the sentiment and/or a particular level of sophistication, which may be used to form the sub-clusters 106 of the clusters 108. Accordingly, in the customer service server 112, the clusters 108 may represent the substantive meaning of a subset of the historical inquiries 202 and the sub-clusters 106 may have a particular sentiment and/or a particular level of sophistication.

Figure 5:
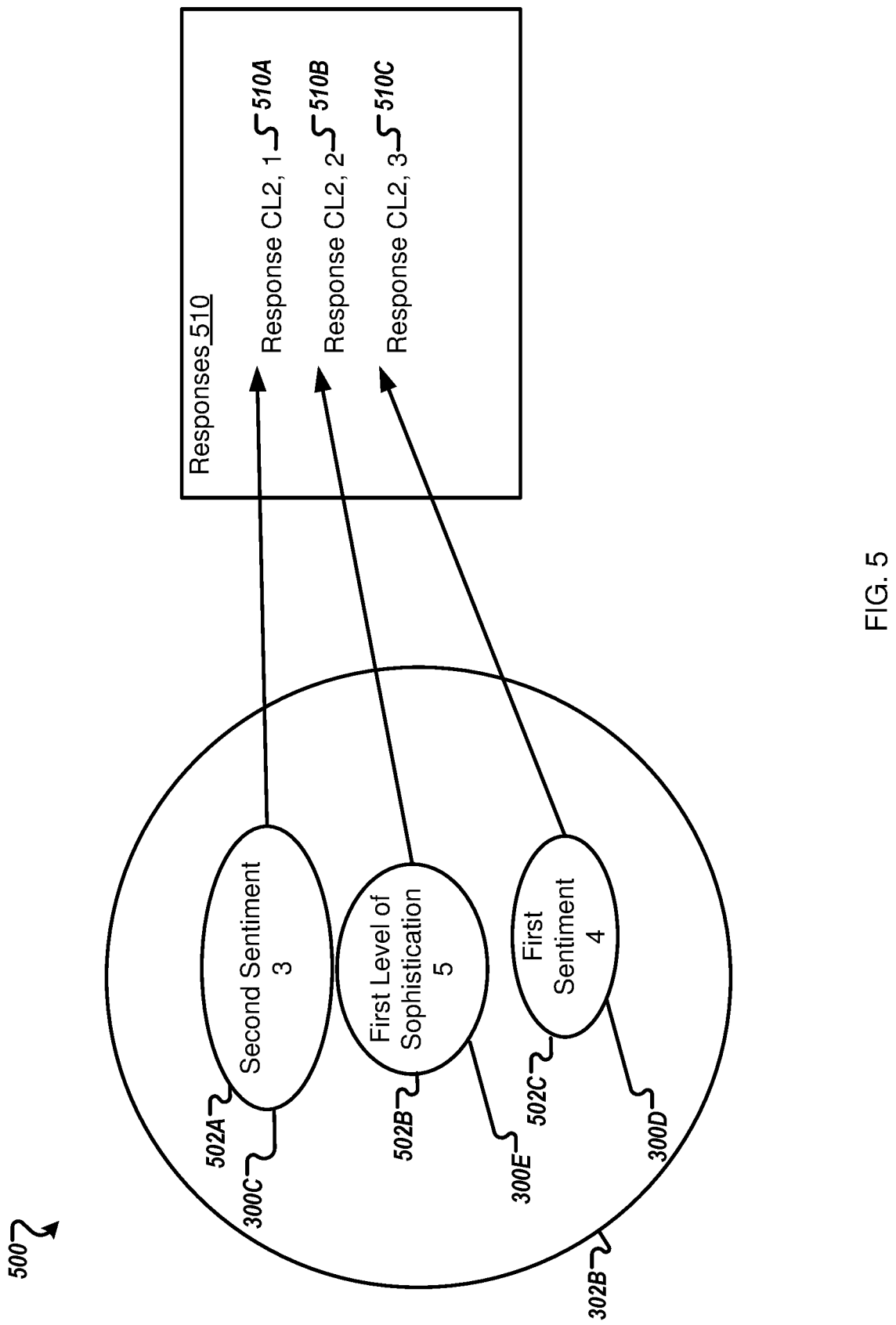
FIG. 5 illustrates an embodiment of a second cluster and a set of responses that may be implemented in the process of FIG. 2.

FIG. 5 illustrates an example embodiment of the second cluster 302B and a set of responses 510 according to at least one embodiment described in the present disclosure. The second cluster 302B may include one or more sub-clusters 502A-502C. The sub-clusters 502A-502C may be substantially similar to and may correspond to the sub-clusters 106 described elsewhere in the present disclosure.

A first sub-clusters 502A may include a second sentiment and may correspond to the third inquiry 300C. A second sub-clusters 502B may include a first level of sophistication and may correspond to the fifth inquiry 300E. A third sub-clusters 502C may include a first sentiment and may correspond to the fourth inquiry 300D. One or more of the sub-clusters 502A-502C may have assigned thereto one of a set of responses 510. The set of responses 510 may have a common substantive theme that addresses the substantive meaning of the second cluster 302B. Each of the responses 510A-510C may be modified according to one of the sub-clusters 502A-502C. For instance, a first response 510A may be modified according to a second sentiment of the first sub-cluster 502A, a second response 510B may be modified according to the first level of sophistication of the second sub-cluster 502B, and a third response 510C may be modified according to a first sentiment of the third sub-cluster 502C.

Referring back to FIG. 2, the validation of the clusters 108 may include a merge operation. The merge operation may combine one or more of the clusters 108. In some embodiments, merging of the clusters 108 may include performance of a pair-wise comparison. For instance, one of the historical inquiries 202 from each of the clusters 108 may be compared with one of the historical inquiries 202 and/or one of the responses 110 from each of the other clusters 108.

Figure 6:
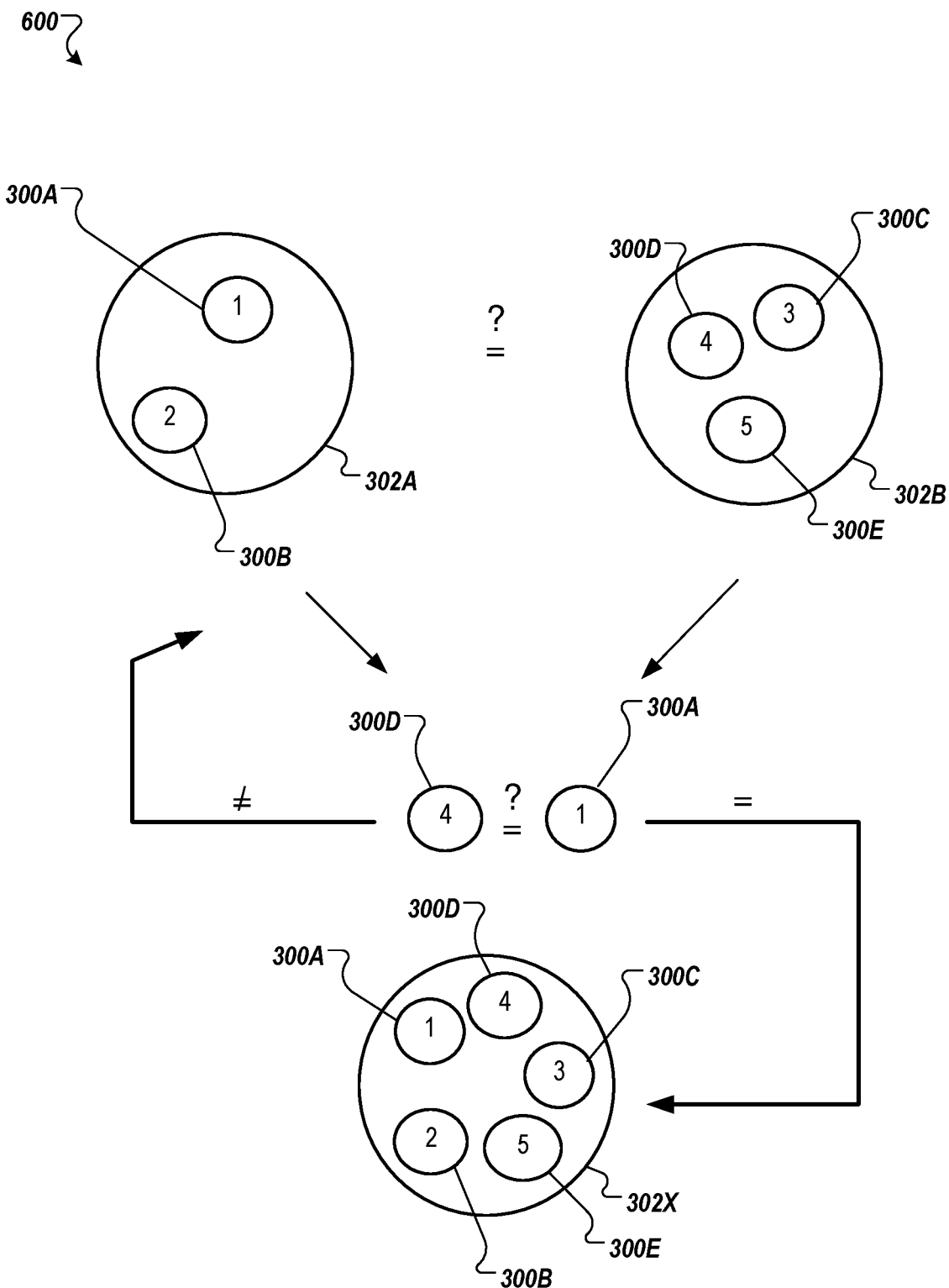
FIG. 6 depicts an example merge operation that may be implemented in the process of FIG. 2.

For instance, FIG. 6 depicts an example merge operation 600 that may be implemented in the process 200 of FIG. 2. In FIG. 6, the first inquiry 300A or the second inquiry 300B may be compared on a pair-wise basis with one of the inquiries 300C, 300D or 300E from the second cluster 302B. For instance, the first inquiry 300A may be compared on a pair-wise basis with the fourth inquiry 300D of the second cluster 302B. In circumstances in which the fourth inquiry 300D includes a similar substantive meaning as the first inquiry 300A, the first cluster 302A may be merged with the second cluster 302B. For example, a merged cluster 302X may be generated. The merged cluster 302X may include the first cluster 302A, the second cluster 302B, the third cluster 302C, the fourth cluster 302D, and the fifth cluster 302D.

In circumstances in which the fourth inquiry 300D includes a dissimilar substantive meaning from the first inquiry 300A, the first cluster 302A may remain separate from the second cluster 302B. For example, in FIG. 6, the inquiries 300A and 300B may remain in the first cluster 302A and the inquiries 300C, 300D, and 300E may remain in the second cluster 302B.

Figure 7:
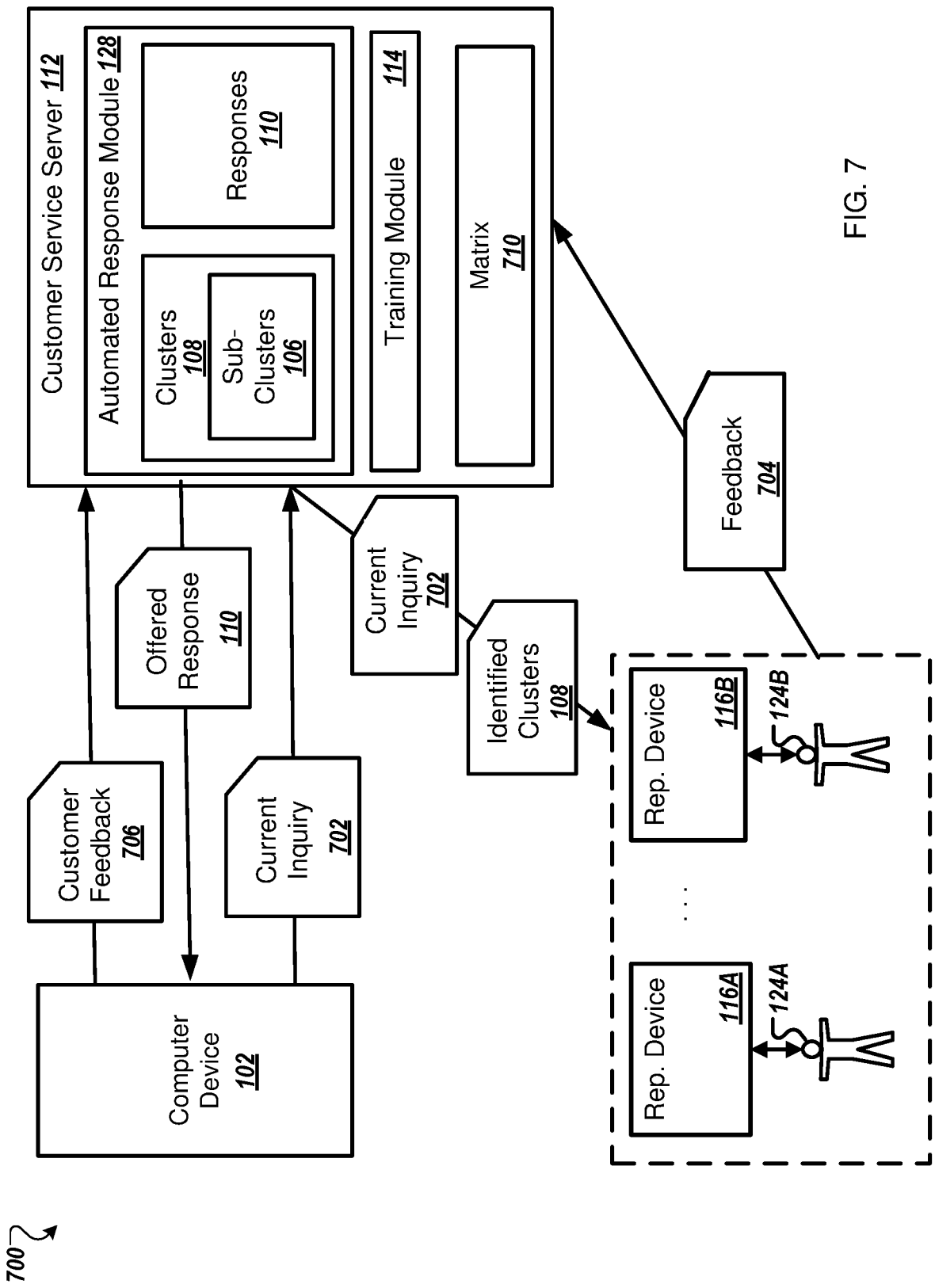
FIG. 7 illustrates an example process of automated inquiry response that may be implemented in the operating environment of FIG. 1.

FIG. 7 illustrates an example process 700 of automated inquiry response according to at least one embodiment described in the present disclosure. The process 700 may be implemented in the operating environment 100 of FIG. 1. For instance, the process 700 may include the customer service server 112, the rep. devices 116, the training module 114, the automated response module 128, and the representatives 124 described with reference to FIG. 1. Generally, the process 700 may occur following the process 200 described above during which the clusters 108, the sub-clusters 106, the responses 110 or some combination thereof may be formed.

In the process 700, the automated response module 128 may be configured to receive a current inquiry 702. The current inquiry 702 may include a question submitted by a customer (e.g., the customer 122 of FIG. 1) from the computer device 102. The current inquiry 702 may pertain to a particular issue such as a problem of a website, a service provided by an enterprise, or another issue. After the current inquiry 702 is received, the automated response module 128 may be configured to compute a substantive issue of the current inquiry 702, a sentiment of the current inquiry 702, a level of sophistication of the current inquiry 702 or some combination thereof.

In some embodiments, the computing performed by the automated response module 128 may include processing the current inquiry 702 using a neural network. For example, the neural network may be trained to detect one of a number of sentiments such as angry, happy, and neutral. The neural network may be trained by providing to the neural network the historical inquiries 202 of FIG. 2 and/or other current inquiries. The historical inquiries 202 and/or the other current inquiries may be labeled with a predominant sentiment, a level of sophistication, and a substantive issue expressed in the historical inquiries 202 of FIG. 2 and/or other current inquiries. The labeling may be performed by an individual such as the representatives 124. For instance, the labeling may be performed during the process 200 described above. After the neural network is trained, the neural network may be provided the current inquiry 702. The neural network may then compute the level of sophistication, the sentiment, the substantive issue, or some combination thereof of the current inquiry 702.

In some embodiments, the automated response module 128 may include a single neural network to compute the level of sophistication, the sentiment, and the substantive issue. In other embodiments, the automated response module 128 may include two or more neural networks to compute each of the levels of sophistication, the sentiment, the substantive issue or some combination thereof.

Additionally or alternatively, in some embodiments, the substantive issue of the current inquiry 702 may be computed based on a presence of specific keywords being present in the current inquiry 702. Additionally still, the substantive issue of the current inquiry 702 may be computed based on a comparison between historical inquiries in the clusters 108 and the current inquiry 702. The comparison may be based on which of the clusters 108 contain the most inquiries that are similar to the current inquiry 702 and may be based on some threshold between the clusters 108 and the current inquiry 702. In some embodiments, the automated response module 128 may implement some algorithm such as sentence2vec or doc2vec to compute similarity between the current inquiry 702 and the inquiries in the clusters 108. In these and other embodiments, the algorithm may output a number between 0 and 1, in which 0 indicates a lack of match and 1 indicates a match.

Based on the substantive issue computed for the current inquiry 702, the automated response module 128 may identify two or more of the clusters 108 to which the current inquiry 702 pertains. The two or more of the clusters 108 may be candidate clusters that may match the current inquiry 702. For example, the current inquiry 702 may include a particular substantive issue. The two or more of the clusters 108 may each include substantive meanings that are similar to the particular substantive issue.

In some embodiments, the automated response module 128 may generate an order of the two or more identified clusters 108 according to the computed level of sophistication of the current inquiry 702 relative to the levels of sophistication assigned to the clusters 108. Generation of the order of the two or more identified clusters 108 may improve a likelihood of finding a match between one of the clusters 108 and the current inquiry 702. For example, if the current inquiry 702 is a basic question, e.g., "What is Wi-Fi?," it is unlikely that a matching one of the clusters 108 is one which deals with a "Spectrum Interference Issues," which may have a higher level of sophistication.

The automated response module 128 may crowdsource a comparison of the substantive issue of the current inquiry 702 to a meaning from each of the two or more identified clusters 108. The comparison may be applied to each of the two or more identified clusters 108 according to the generated order. The comparison may cease at one of the two or more identified clusters 108 that includes a substantive meaning that substantially matches the substantive issue of the current inquiry 702. The identified clusters 108 may be communicated to the rep. devices 116. The representatives may compare the substantive issue of the current inquiry 702 to a meaning from each of the two or more identified clusters 108. The representatives 124 may communicate feedback 704 to the automated response module 128. The feedback 704 may indicate which of the two or more identified clusters 108 has a meaning that is most similar or matches the substantive issue of the current inquiry 702. Based on the feedback 704, the automated response module 128 may determine which of the clusters 108 include a meaning that is most similar or matches the substantive issue of the current inquiry 702.

After the clusters 108 that matches the substantive issue of the current inquiry 702 are determined, one of the sub-clusters 106 that is associated with the sentiment and/or the level of sophistication is also determined.

As discussed above, one of the responses 110 may be associated with each of the sub-clusters 106. The automated response module 128 may access a particular response 110 that is associated with the sub-cluster 106 associated with the sentiment and/or the level of sophistication of the current inquiry 702. The automated response module 128 may then offer the response 110 to the computer device 102 (in FIG. 7, "offered response 110"). The offered response 110 may address the substantive issue of the current inquiry 702. Additionally, the offered response 110 may be modified according to the sentiment and/or the level of sophistication of the current inquiry 702.

The offered response 110 may address the substantive issue of the current inquiry 702. In circumstances in which the offered response 110 properly addresses the substantive issue, the interaction between the computer device 102 and the customer service server 112. In circumstances in which the customer is dissatisfied with the offered response 110, the computer device 102 may communicate customer feedback 706 to the customer service server 112. The customer feedback 706 may indicate that the offered response 110 is insufficient. For example, the customer feedback 706 may include an additional inquiry, similar to the current inquiry 702. Additionally, the customer feedback 706 may include a complaint, etc.

The customer service server 112 may be configured to receive the customer feedback 706 from the computer device 102. Responsive to the customer feedback 706, the customer service server 112 may assign the current inquiry 702 and/or the customer feedback 706 to one of the representatives 124. Assignment of the current inquiry 702 may include establishment of a connection between the rep. device 116 and the computer device 102. In some embodiments, the customer service server 112 may assign the current inquiry 702 and/or the customer feedback 706 based on a collective matrix factorization (matrix factorization) 710.

FIG. 8 is an example embodiment of the matrix factorization 710, which may be implemented in the process 700 of FIG. 7. The matrix factorization 710 may include a first matrix 800, a second matrix 808, and a third matrix 812. The first matrix 800 may correlate the customers 122 and inquiries 802 by levels of sophistications 806 and sentiments 804. The inquiries 802 may be substantially similar to the historical inquiries 202 and/or the current inquiry 702 described herein. For example, the first matrix 800 relates a first inquiry 802A with a first sentiment 804A and a first level of sophistication 806A. The second matrix 808 may correlate the representatives 124 and user ratings 810A-810I. Additionally, the second matrix 808 may organize the ratings 810A-810I by the customers 122. For instance, the first customer 122A may provide a first rating 810A, a second rating 810B, and a third rating 810C. The third matrix 812 may be used to forecast effectiveness of the representatives 124 to deal with a current inquiry. The forecast of the effectiveness may be based on the level of sophistication and the sentiment of the current inquiry. The third matrix 812 may be based on the first matrix 800 and the second matrix 808. For instance, the ratings 810A-810I may correspond to the inquiries 802, which further correspond to the sentiments 804 and the levels of sophistication 806. The third matrix 812 may thus indicate that the representatives 124 are effective or not effective at handling inquiries 802 having the sentiment 814 and/or the level of sophistication 816. In the third matrix 812, the sentiment 814 and the level of sophistication 816 may be provided on a scale of 0 to 1. In other embodiments, the sentiment 814 and the level of sophistication 816 may be provided on another suitable scale.

With combined reference to FIGS. 7 and 8, following receipt of the customer feedback 706, the sentiment and the level of sophistication of the current inquiry 702 may be computed as described above. Based on the computed sentiment and the level of sophistication, one of the representatives 124 may be selected. For instance, the computed sentiment may be about 0.7 (on a scale of 0 to 1) and the computed level of sophistication may be about 0.3 (on a scale of 0 to 1). Accordingly, the automated response module 128 may select the first representative 124A.

The matrix factorization 710 may also be used to track the customer feedback 706 from the customer 122 and/or whether the assigned representative 124 addresses the current inquiry 702. Based on the matrix factorization 710, the customer service server 112 may also identify an issue or problem in a service related to the current inquiry 702 and on historical inquiries. For instance, identification of the issues or the problems may be based on the substantive issue of the current inquiry and other inquiries, the sentiment of the current inquiry and other inquiries, and the level of sophistication of the current inquiry and other inquiries. Following identification of the issues or the problems, the customer service server 112 may implement a solution to the identified issue.

Additionally, based on the matrix factorization 710, the customer service server 112 may be configured to evaluate the representatives 124. For instance, based on the matrix factorization 710 or on metrics tracked by the customer service server 112, the customer service server 112 may evaluate the representatives 124.

Figure 9:
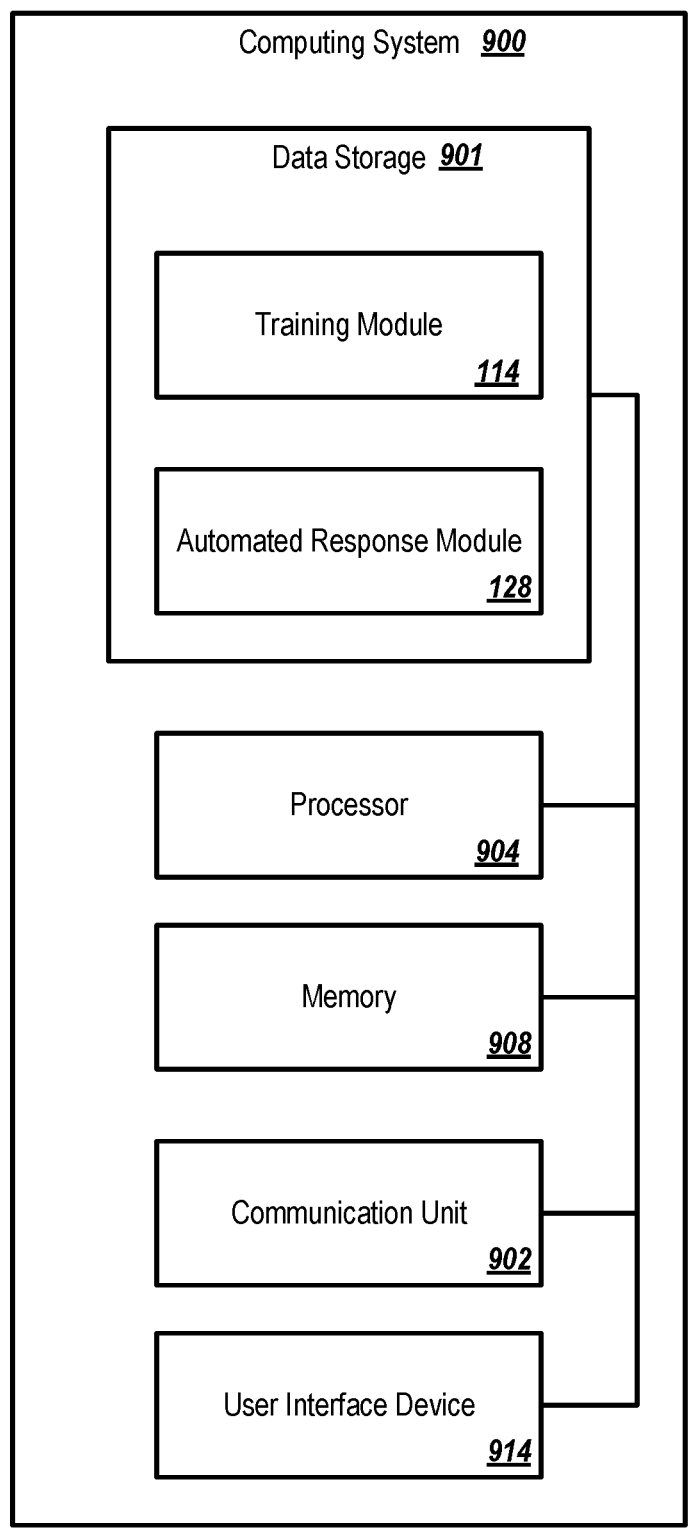
FIG. 9 illustrates an example computing system configured for automated inquiry response.

FIG. 9 illustrates an example computing system 900 configured for automated inquiry response according to at least one embodiment of the present disclosure. The computing system 900 may be implemented in the operating environment 100 of FIG. 1, for instance. Examples of the computing system 900 may include the computer device 102, the rep. device 116, the customer service server 112, or some combination thereof. The computing system 900 may include one or more processors 904, a memory 908, a communication unit 902, the user interface device 914, and a data storage 901 that includes the automated response module 128 and the training module 114 (collectively, modules 128/114).

The processor 904 may include any suitable special-purpose or general-purpose computer, computing entity, or processing device including various computer hardware or software modules and may be configured to execute instructions stored on any applicable computer-readable storage media. For example, the processor 904 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 9, the processor 904 may more generally include any number of processors configured to perform individually or collectively any number of operations described in the present disclosure. Additionally, one or more of the processors 904 may be present on one or more different electronic devices or computing systems. In some embodiments, the processor 904 may interpret and/or execute program instructions and/or process data stored in the memory 908, the data storage 901, or the memory 908 and the data storage 901. In some embodiments, the processor 904 may fetch program instructions from the data storage 901 and load the program instructions in the memory 908. After the program instructions are loaded into the memory 908, the processor 904 may execute the program instructions.

The memory 908 and the data storage 901 may include computer-readable storage media for carrying or having computer-executable instructions or data structures stored thereon. Such computer-readable storage media may include any available media that may be accessed by a general-purpose or special-purpose computer, such as the processor 904. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 904 to perform a certain operation or group of operations.

The communication unit 902 may include one or more pieces of hardware configured to receive and send communications. In some embodiments, the communication unit 902 may include one or more of an antenna, a wired port, and modulation/demodulation hardware, among other communication hardware devices. In particular, the communication unit 902 may be configured to receive a communication from outside the computing system 900 and to present the communication to the processor 904 or to send a communication from the processor 904 to another device or network.

The user interface device 914 may include one or more pieces of hardware configured to receive input from and/or provide output to a user. In some embodiments, the user interface device 914 may include one or more of a speaker, a microphone, a display, a keyboard, a touch screen, or a holographic projection, among other hardware devices.

The modules 128/114 may include program instructions stored in the data storage 901. The processor 904 may be configured to load the modules 128/114 into the memory 908 and execute the modules 128/114. Alternatively, the processor 904 may execute the modules 128/114 line-by-line from the data storage 901 without loading them into the memory 908. When executing the modules 128/114, the processor 904 may be configured to perform a participation verification process as described elsewhere in this disclosure.

Modifications, additions, or omissions may be made to the computing system 900 without departing from the scope of the present disclosure. For example, in some embodiments, the computing system 900 may not include the user interface device 914. In some embodiments, the different components of the computing system 900 may be physically separate and may be communicatively coupled via any suitable mechanism. For example, the data storage 901 may be part of a storage device that is separate from a server, which includes the processor 904, the memory 908, and the communication unit 902, that is communicatively coupled to the storage device. The embodiments described herein may include the use of a special-purpose or general-purpose computer including various computer hardware or software modules, as discussed in greater detail below.

Figure 10A:
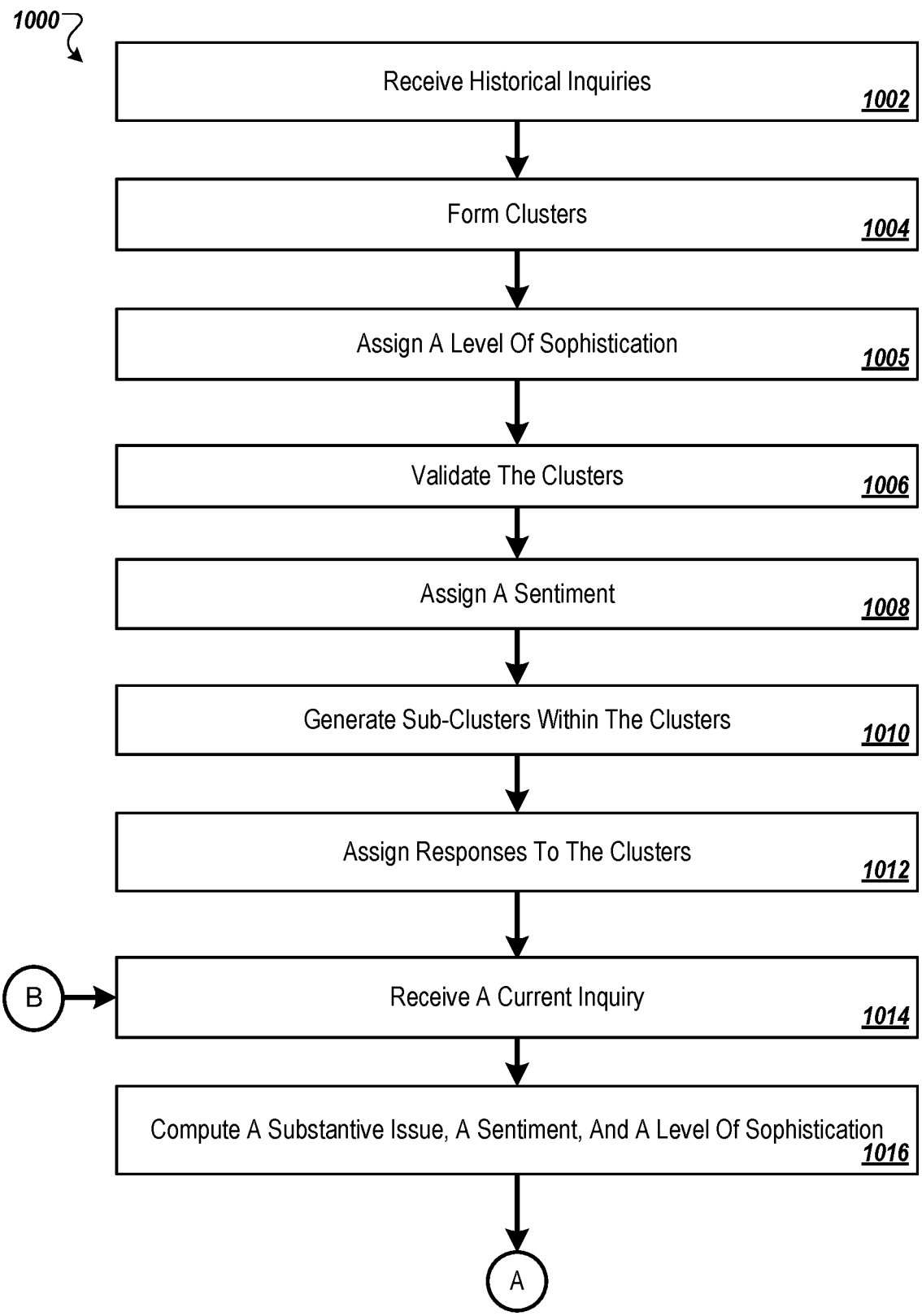
FIGS. 10A-10B are a flow chart of an example method of automated inquiry response, all according to at least one embodiment described in the present disclosure.
Figure 10B:
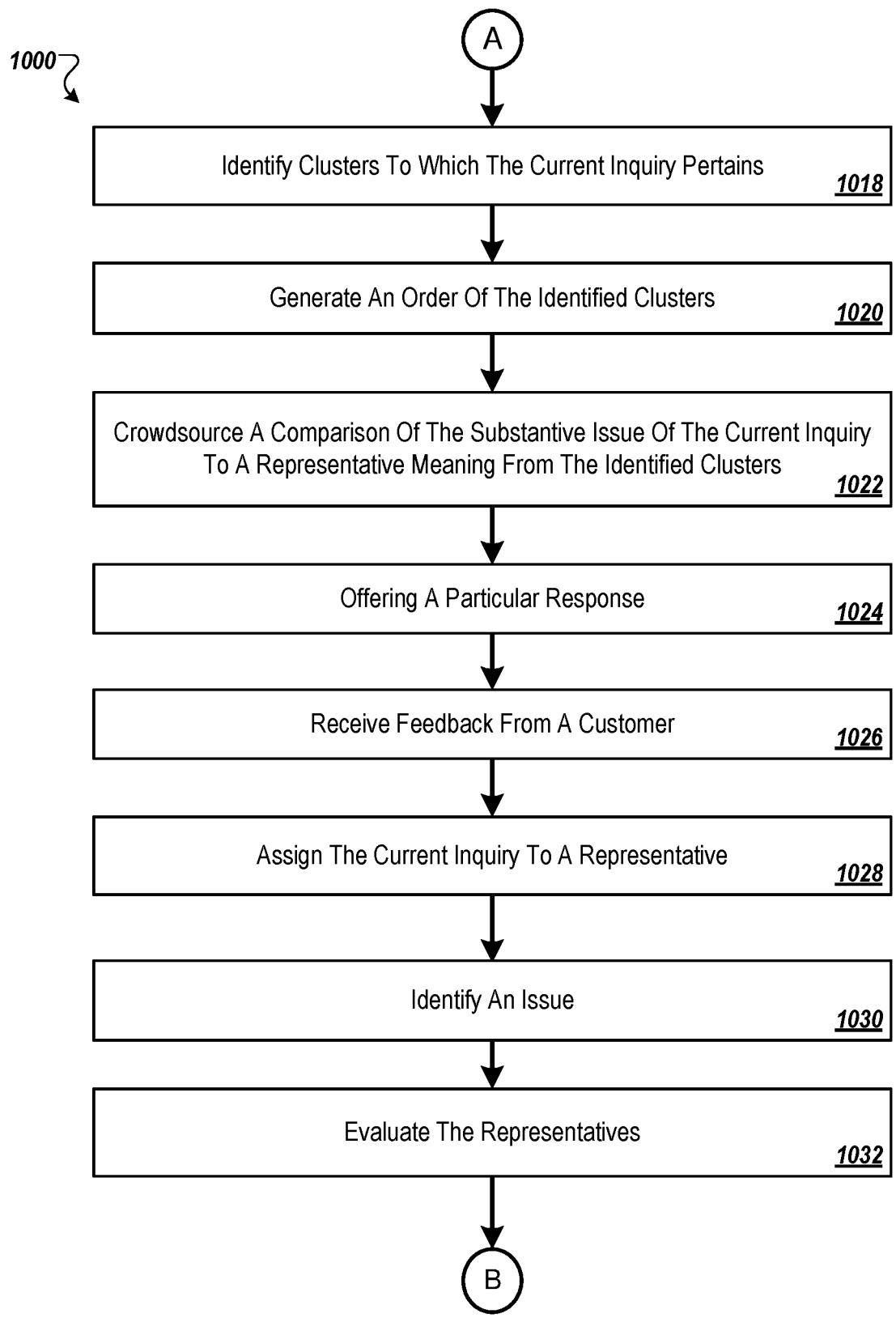

FIGS. 10A-10B are a flow chart of an example method 1000 of automated inquiry response, according to at least one embodiment described in the present disclosure. The method 1000 may be performed in an operating environment such as the operating environment 100 of FIG. 1. The method 1000 may be programmably performed in some embodiments by the customer service server 112 described with reference to FIG. 1. In some embodiments, the customer service server 112 or another computing system may include or may be communicatively coupled to a non-transitory computer-readable medium (e.g., the memory 908 of FIG. 9) having stored thereon programming code or instructions that are executable by one or more processors (such as the processor 904 of FIG. 9) to cause a computing system and/or the customer service server 112 to perform or control performance of the method 1000. Additionally or alternatively, the customer service server 112 may include the processor 904 described elsewhere in this disclosure that is configured to execute computer instructions to cause the customer service server 112 or another computing system to perform or control performance of the method 1000. Although illustrated as discrete blocks, various blocks in FIGS. 10A-10B may be divided into additional blocks, combined into fewer blocks, or eliminated, depending on the desired implementation.

With reference to FIG. 10A, the method 1000 may begin at block 1002 in which historical inquiries may be received. At block 1004, clusters may be formed. The clusters may be formed based on the historical inquiries. The clusters may represent a substantive meaning of a subset of the historical inquiries. In some embodiments, formation of the clusters may be based at least partially on topic modeling, probabilistic language models applied to the historical inquiries, neural network modeling, or some combination thereof.

At block 1005, a level of sophistication may be assigned. The level of sophistication may be assigned to the subset of the historical inquiries included in the clusters. In some embodiments, assignment of the level of sophistication may include crowdsourcing. For instance, assignment of the level of sophistication may include crowdsourcing the assignments to one or more representatives and/or to one or more third party evaluators.

At block 1006, the clusters may be validated. In some embodiments, validation of the clusters may include performance of a pair-wise comparison of the historical inquiries included in one or more of the clusters. In some embodiments, the validation includes crowdsourcing the pair-wise comparison of the historical inquiries to one or more individuals such as representatives and/or third party evaluators. Additionally, the validation of the clusters may include merging the clusters to combine one or more of the clusters. In some embodiments, the merging includes performance of a pair-wise comparison of one of the historical inquiries from each of the clusters with one of the historical inquiries from each of the other clusters.

At block 1008, a sentiment and/or a level of sophistication may be assigned. The sentiment and/or the level of sophistication may be assigned to one or more of the subset of the historical inquiries included in the clusters. In some embodiments, assignment of the level of sophistication and/or the sentiment may include crowdsourcing. For instance, assignment of the level of sophistication and/or the sentiment may include crowdsourcing the assignments to the representatives and/or to the third party evaluators. At block 1010, sub-clusters may be generated. The sub-clusters may be generated within one or more of the clusters. The sub-clusters may represent the level of sophistication or the sentiment of one or more of the subset of the historical inquiries of the cluster.

At block 1012, responses or a set of responses may be assigned to the clusters. For example, each response of the set of responses may be assigned to one of the sub-clusters. The set of responses for each of the clusters may include a common substantive theme. The common substantive theme may address the substantive meaning of a current inquiry. Each of the responses for the clusters may be modified based on the level of sophistication and/or the sentiment of the sub-cluster.

At block 1014, a current inquiry may be received. At block 1016, a substantive issue, a sentiment, a level of sophistication or some combination thereof may be computed. For example, the substantive issue of the current inquiry, the sentiment of the current inquiry, and the level of sophistication of the current inquiry may be computed. In some embodiments, the computing includes processing the current inquiry using a neural network.

With reference to FIG. 10B, at block 1018, the clusters to which the current inquiry pertains may be identified. The clusters to which the current inquiry pertains may be identified based on the substantive issue of the current inquiry. At block 1020, an order of the identified clusters may be generated. For instance, the order may be set according to the computed level of sophistication relative to the levels of sophistication assigned to the clusters. At block 1022, a comparison of the substantive issue of the current inquiry to a meaning of identified clusters may be crowdsourced. For instance, the comparison may be crowdsourced to the representatives and/or the third party evaluators. The comparison may be applied to each of the identified clusters according to the generated order. The comparison may cease at one of the identified clusters that includes a substantive meaning that matches or substantially matches the substantive issue of the current inquiry.

At block 1024, a particular response may be offered. The particular response may be offered to a customer device associated with a customer who communicated the current inquiry. The particular response may be associated with one of the sub-clusters and one of the clusters. The particular response may be associated with one of the identified clusters that includes a substantive meaning that matches the substantive issue of the current inquiry according to the crowdsourcing. The particular response may be associated with the sub-cluster generated in the one identified cluster for the sentiment or the level of sophistication of the current inquiry.

At block 1026, feedback may be received. The feedback may be received from a customer that submitted the current inquiry. The feedback may indicate that the offered response is insufficient. At block 1028, the current inquiry may be assigned to a representative. The current inquiry may be assigned to a representative based on a collective matrix factorization. In some embodiments, the collective matrix factorization may include a first matrix, a second matrix, and a third matrix. The first matrix may correlate the customer with the level of sophistication and the sentiment of inquiries. The second matrix may correlate the representative and a user rating. The third matrix may forecast effectiveness of the representative to deal with the current inquiry based on the level of sophistication and the sentiment of the current inquiry.

At block 1030, an issue may be identified. The issue may be identified in a service related to the current inquiry based on the substantive issue of the current inquiry, the sentiment of the current inquiry, the level of sophistication of the current inquiry or some combination thereof. At block 1032, the representatives may be evaluated. The representatives may be based on the third matrix. From block 1032, the method 1000 may proceed to block 1014 when another current inquiry is received. The method 1000 may then proceed through one or more of blocks 1016, 1018, 1020, 1022, 1024, 1026, 1028, 1030, and 1032.

It may be appreciated that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:
1. A method of automated inquiry response, the method comprising:
receiving historical inquiries;

forming clusters based on the historical inquiries, each of the clusters representing a substantive meaning of a subset of the historical inquiries;

assigning a level of sophistication to each of the clusters, the level of sophistication representative of a complexity of substantive meaning;

generating sub-clusters within each of the clusters, each of the sub-clusters representing the level of sophistication or a sentiment of one or more of the subset of the historical inquiries of the cluster, the sentiment representative of a state of mind of a submitter of a Particular historical inquiry;

assigning a plurality of responses to each of the clusters, each response of the plurality of responses being assigned to one of the sub-clusters, the plurality of responses including a common substantive theme that addresses the substantive meaning of the cluster and each response being modified based on the sentiment or the level of sophistication of the sub-cluster;

receiving a current inquiry;

computing a substantive issue of the current inquiry, a sentiment of the current inquiry, and a level of sophistication of the current inquiry, the computing based on language of the current inquiry;

based on the substantive issue of the current inquiry, identifying two or more of the clusters to which the current inquiry pertains;

generating an order of the two or more identified clusters, the order being set according to the computed level of sophistication of the current inquiry relative to the levels of sophistication assigned to the clusters;

crowdsourcing a comparison of the substantive issue of the current inquiry to meanings from each of the two or more identified clusters, the comparison being applied to each of the two or more identified clusters according to the generated order and ceasing at one of the two or more identified clusters that includes a substantive meaning that substantially matches the substantive issue of the current inquiry; and offering a particular response to a customer device, the particular response being associated with one of the two or more identified clusters that includes a substantive meaning that matches the substantive issue of the current inquiry according to the crowdsourcing and the particular response being associated with the sub-cluster generated in the one of the two or more identified cluster for the sentiment and the level of sophistication of the current inquiry.

2. The method of claim 1, wherein the forming the clusters is based on one or more or a combination of topic modeling, probabilistic language models applied to the historical inquiries, and neural network-based modeling.

3. The method of claim 1, further comprising validating the clusters, wherein the validating includes:

performing a pair-wise comparison of the historical inquiries included in each of the clusters; and merging the clusters to combine one or more of the clusters.

4. The method of claim 3, wherein the merging includes performing a pair-wise comparison of one of the historical inquiries from each of the clusters with one of the historical inquiries from each of the other clusters.

5. The method of claim 3, further comprising assigning one or both of the sentiment and the level of sophistication to the subset of the historical inquiries.

6. The method of claim 5, wherein:

the validating includes crowdsourcing the pair-wise comparison of the historical inquiries to representatives and/or third party evaluators; and the assigning includes crowdsourcing assignment of one or both of the sentiment and the level of sophistication to the subset of the historical inquiries.

7. The method of claim 1, wherein the computing includes processing the current inquiry using a neural network.

8. The method of claim 1, further comprising:

receiving feedback from a customer that submitted the current inquiry indicating that the offered response is insufficient; and assigning the current inquiry to a representative based on a collective matrix factorization.

9. The method of claim 8, wherein the collective matrix factorization includes:

a first matrix that correlates the customer with the level of sophistication and the sentiment;

a second matrix that correlates the representative and a user rating; and a third matrix that forecasts effectiveness of the representative to deal with the current inquiry based on the level of sophistication and the sentiment of the current inquiry.

10. The method of claim 9, further comprising:

identifying an issue in a service related to the current inquiry based on the substantive issue of the current inquiry, the sentiment of the current inquiry, and the level of sophistication of the current inquiry; and evaluating the representative based on the third matrix.

11. A non-transitory computer-readable medium having encoded therein programming code executable by a processor to perform or control performance of operations comprising:

receiving historical inquiries;

forming clusters based on the historical inquiries, each of the clusters representing a substantive meaning of a subset of the historical inquiries;

assigning a level of sophistication to each of the clusters, the level of sophistication representative of a complexity of substantive meaning;

generating sub-clusters within each of the clusters, each of the sub-clusters representing the level of sophistication or a sentiment of one or more of the subset of the historical inquiries of the cluster, the sentiment representative of a state of mind of a submitter of a given historical inquiry;

assigning a plurality of responses to each of the clusters, each response of the plurality of responses being assigned to one of the sub-clusters, the plurality of responses including a common substantive theme that addresses the substantive meaning of the cluster and each response being modified based on the sentiment or the level of sophistication of the sub-cluster;

receiving a current inquiry;

computing a substantive issue of the current inquiry, a sentiment of the current inquiry, and a level of sophistication of the current inquiry, the computing based on language of the current inquiry;

based on the substantive issue of the current inquiry, identifying two or more of the clusters to which the current inquiry pertains;

generating an order of the two or more identified clusters, the order being set according to the computed level of sophistication of the current inquiry relative to the levels of sophistication assigned to the clusters;

crowdsourcing a comparison of the substantive issue of the current inquiry to meanings from each of the two or more identified clusters, the comparison being applied to each of the two or more identified clusters according to the generated order and ceasing at one of the two or more identified clusters that includes a substantive meaning that substantially matches the substantive issue of the current inquiry; and offering a particular response to a customer device, the particular response being associated with one of the two or more identified clusters that includes a substantive meaning that matches the substantive issue of the current inquiry according to the crowdsourcing and the particular response being associated with the sub-cluster generated in the one of the two or more identified cluster for the sentiment and the level of sophistication of the current inquiry.

12. The non-transitory computer-readable medium of claim 11, wherein the forming the clusters is based on one or more or a combination of topic modeling, probabilistic language models applied to the historical inquiries, and neural network-based modeling.

13. The non-transitory computer-readable medium of claim 11, wherein:
the operations further comprise validating the clusters; and
the validating includes:
performing a pair-wise comparison of the historical inquiries included in each of the clusters; and
merging the clusters to combine one or more of the clusters.

14. The non-transitory computer-readable medium of claim 13, wherein the merging includes performing a pair-wise comparison of one of the historical inquiries from each of the clusters with one of the historical inquiries from each of the other clusters.

15. The non-transitory computer-readable medium of claim 13, wherein the operations further comprise assigning one or both of the sentiment and the level of sophistication to the subset of the historical inquiries.

16. The non-transitory computer-readable medium of claim 15, wherein:
the validating includes crowdsourcing the pair-wise comparison of the historical inquiries to representatives and/or third party evaluators; and
the assigning includes crowdsourcing assignment of one or both of the sentiment and the level of sophistication to the subset of the historical inquiries.

17. The non-transitory computer-readable medium of claim 11, wherein the computing includes processing the current inquiry using a neural network.

18. The non-transitory computer-readable medium of claim 11, wherein the operations further comprise:
receiving feedback from a customer that submitted the current inquiry indicating that the offered response is insufficient; and
assigning the current inquiry to a representative based on a collective matrix factorization.

19. The non-transitory computer-readable medium of claim 18, wherein the collective matrix factorization includes:
a first matrix that correlates the customer with the level of sophistication and the sentiment;
a second matrix that correlates the representative and a user rating; and
a third matrix that forecasts effectiveness of the representative to deal with the current inquiry based on the level of sophistication and the sentiment of the current inquiry.

20. The non-transitory computer-readable medium of claim 19, wherein the operations further comprise:
identifying an issue in a service related to the current inquiry based on the substantive issue of the current inquiry, the sentiment of the current inquiry, and the level of sophistication of the current inquiry; and
evaluating the representative based on the third matrix.

* * * * *